United States Patent [19]

Sato et al.

[11] Patent Number: 5,096,775
[45] Date of Patent: Mar. 17, 1992

[54] RESIN LAMINATE

[75] Inventors: Hiroyuki Sato; Masahide Ochiumi, both of Yokkaichi, Japan

[73] Assignee: Mitsubishi Petrochemical Company, Ltd., Tokyo, Japan

[21] Appl. No.: 753,447

[22] Filed: Aug. 30, 1991

[30] Foreign Application Priority Data

| Sep. 5, 1990 [JP] | Japan | 2-233389 |
|---|---|---|
| Sep. 18, 1990 [JP] | Japan | 2-246166 |
| Sep. 18, 1990 [JP] | Japan | 2-246167 |
| Sep. 18, 1990 [JP] | Japan | 2-246168 |
| Sep. 18, 1990 [JP] | Japan | 2-246169 |

[51] Int. Cl.$^5$ .................. B32B 5/16; B32B 27/36; C08L 51/06
[52] U.S. Cl. ................... 428/327; 428/339; 428/412; 428/475.8; 428/483; 428/518; 428/519; 428/520; 428/516; 428/414; 428/424.4; 428/419; 525/64; 525/69; 264/176.1
[58] Field of Search ............ 428/339, 412, 483, 327, 428/520, 519, 518, 475.8; 525/64, 65, 69, 327.8

[56] References Cited

U.S. PATENT DOCUMENTS

| 4,548,985 | 10/1985 | Yazaki et al. | 525/65 |
| 4,600,648 | 7/1986 | Yazaki et al. | 525/65 X |
| 4,720,425 | 1/1988 | Hattori et al. | 428/412 |
| 4,810,581 | 3/1989 | Akazawa et al. | 428/412 |
| 4,810,755 | 3/1989 | Akazawa et al. | 525/327.8 |

Primary Examiner—P. C. Sluby
Attorney, Agent, or Firm—Oblon, Spivak, McClelland, Maier & Neustadt

[57] ABSTRACT

A resin laminate include: a gas barrier resin layer (layer A) made of a saponified ethylene-vinyl acetate copolymer or a polyamide resin; a layer (layer B) made of at least one type of thermoplastic resin selected from a group consisting of a polycarbonate resin, a chlorine containing resin, a thermoplastic polyester resin, an acrylic resin and a styrene resin; and an adhesive polymer layer (layer C) for bonding the gas barrier resin layer (layer A) and the layer (layer B). The adhesive polymer layer (C) is a polymer composition consisting essentially of modified polyolefin grafted with unsaturated carboxylic acid or unsaturated carboxylic anhydride and modified ethylene-vinyl acetate copolymer obtained by grafting vinyl acetate on ethylene-vinyl acetate copolymer.

7 Claims, No Drawings

RESIN LAMINATE

BACKGROUND OF THE INVENTION

1. Field of the Invention

The present invention relates to a resin laminate, and more particularly, to a multilayer resin laminate in which a gas barrier resin layer made of a saponified ethylene-vinyl acetate copolymer or a polyamide resin is adhesive bonded to a selected specific thermoplastic resin layer using an adhesive polymer layer made of a specific modified polyolefin compound.

2. Background Art

Although a polycarbonate resin (hereinafter referred to as a PC) exhibits excellent transparency, heat-resistance and mechanical strength, it does not show a practically sufficient level of moisture impermeability or oxygen barrier properties.

It has therefore been proposed to overcome these drawbacks of the PC while making best use of the advantages thereof by laminating a PC on a resin exhibiting complementary characteristics, such as a polyolefin exhibiting excellent moisture impermeability or a saponified ethylene-vinyl acetate copolymer exhibiting excellent oxygen barrier properties.

This technique has been examined positively particularly in the field of co-extrusion or co-injection molding which ensures effective manufacture of laminates or in the drawing process carried out subsequent to the co-extrusion or co-injection process.

It has been described in, for example, Japanese Patent Laid-Open Nos. 52-125588 and 52-32078, that a polyolefin graft modified by an unsaturated carboxylic acid or a derivative thereof shows excellent adhesion to the PC.

However, the above-described technique has a drawback in that the initial adhesive strength of the polyolefin to the PC is as low as from 150 to 200 g/10 mm, as has been stated in the aforementioned specification.

In other words, a high performance adhesive resin is not known which is capable of firmly adhesive bonding the PC to a saponified ethylene-vinyl acetate copolymer when they are laminated on top of the other by co-extrusion or co-injection molding. Therefore, the production of laminates which could be employed in a wide range of applications is still impossible.

Chlorine resins, e.g., vinyl chloride resin, exhibit excellent resistance to solvents, water resistance, acid resistance, alkali resistance and flame resistance and are thus used in various application fields as food containers and packing materials. However, the oxygen barrier properties of chlorine resins are not at a practical level.

Attempts have therefore been made to overcome the drawbacks of chlorine resins, such as vinyl chloride resin, while making best use of the advantages thereof by laminating it on a resin exhibiting complementary characteristics, such as a polyolefin exhibiting excellent chemical resistance or a saponified ethylene-vinyl acetate copolymer exhibiting excellent oxygen barrier properties.

This technique has been examined positively particularly in the fields of co-extrusion and co-injection molding which ensures effective manufacture of laminates or in the drawing process carried out subsequent to the co-extrusion and co-injection process.

However, a high performance adhesive resin has not been developed which is capable of firmly adhesive bonding the chlorine resin to a resin exhibiting excellent gas barrier properties. For example, in laminating a chlorine containing resin and an ethylene-vinyl acetate copolymer, when a large amount of vinyl acetate in the form of an α-copolymer with ethylene is introduced so as to improve the adhesion, the mechanical strength of the copolymer is reduced resulting in no improvements in adhesion strength.

Furthermore, a generally employed adhesive polyolefin, $\alpha,\beta$-unsaturated carboxylic acid graft modified or epoxy group containing polyolefin, does not show sufficient adhesion performance to the chlorine containing resin.

Although a thermoplastic polyester resin (hereinafter referred to as a PES) exhibits excellent transparency, heat-resistance and mechanical strength, it does not show a practically sufficient level of moisture impermeability or oxygen barrier properties.

It has therefore been proposed to overcome the drawbacks of the PES while making best use of the advantages thereof by laminating a PES on a resin exhibiting complementary characteristics, such as a polyolefin exhibiting excellent moisture impermeability or a saponified ethylene-vinyl acetate copolymer exhibiting excellent oxygen barrier properties.

This technique has been examined positively particularly in the field of co-extrusion or co-injection molding which ensures effective manufacture of laminates or in the drawing process carried out subsequent to the co-extrusion or co-injection process.

It has been described in, for example, Japanese Patent Laid-Open Nos. 52-125588 and 52-32078, that a polyolefin graft modified by an unsaturated carboxylic acid or a derivative thereof shows excellent adhesion to the PES.

However, the above-described technique has a drawback in that the initial adhesive strength level of the polyolefin to the PES is as low as from 200 to 270 g/10 mm, as has been stated in the aforementioned specifications.

In other words, a high performance adhesive resin is not known which is capable of firmly adhesive bonding the PES to a saponified ethylene-vinyl acetate copolymer when they are laminated on top of each other by co-extrusion or co-injection molding. Therefore, the production of laminates which could be employed in a wide range of applications is still impossible.

Acrylic resins exhibit transparency, excellent weathering resistance, chemical resistance and electric insulation, are light in weight and strong, and show excellent processability. Therefore, acrylic resins have been used in various fields, as forming materials, food containers and packaging materials. However, the oxygen barrier properties of the acrylic resins are not at a practical level.

Attempts have therefore been made to overcome the drawbacks of acrylic resins while making best use of the advantages thereof by laminating an acrylic resin on a resin exhibiting complementary characteristics, such as a saponified ethylene-vinyl acetate copolymer exhibiting excellent oxygen barrier properties.

This technique has been examined positively particularly in the fields of co-extrusion or co-injection molding which ensures effective manufacture of laminates or in the drawing process carried out subsequent to the co-extrusion or co-injection process.

However, a high performance adhesive resin has not been developed which is capable of firmly adhesive bonding an acrylic resin to a resin exhibiting excellent gas barrier properties. For example, in laminating an acrylic resin and an ethylene-vinyl acetate copolymer, when a large amount of vinyl acetate in the form of an α-copolymer with ethylene is introduced so as to improve the adhesion, the mechanical strength of the copolymer is reduced resulting in no improvement in adhesion strength.

Furthermore, a generally employed adhesive polyolefin, α,β-unsaturated carboxylic acid graft modified or epoxy group containing polyolefin, does not show sufficient adhesion performance to the acrylic resin.

Styrene resins are stable to heat, exhibit excellent processability, and are characterized by their low hygroscopic property, tastelessness and odorlessness and chemical inactivity. Therefore, styrene resins have been used in various fields, as food containers and packing materials. However, the oxygen barrier properties of the styrene resins are not at a practical level.

Attempts have therefore been made to overcome the drawbacks of styrene resins while making best use of the advantages thereof by laminating a styrene resin on a resin exhibiting complementary characteristics, such as a saponified ethylene-vinyl acetate copolymer exhibiting excellent oxygen barrier properties.

This technique has been examined positively particularly in the field of co-extrusion or co-injection molding which ensures effective manufacture of laminates or in the drawing process carried out subsequent to the co-extrusion or co-injection process.

However, a high performance adhesive resin has not been developed which is capable of firmly bonding a styrene resin to a resin exhibiting excellent gas barrier properties. For example, in laminating an styrene resin and an ethylene-vinyl acetate copolymer, when the proportion of vinyl acetate which forms a copolymer together with ethylene is increased so as to improve the adhesion, the mechanical strength of the copolymer is reduced while the adhesion strength is not improved.

Furthermore, a generally employed adhesive polyolefin, α,β-unsaturated carboxylic acid graft modified or epoxy group containing polyolefin, does not show sufficient adhesion performance to the styrene resin.

SUMMARY OF THE INVENTION

An object of the invention is to overcome the drawbacks of the aforementioned specific resins which appear in laminate adhesive bonding. That is, an object of the present invention is to provide an adhesive resin which is capable of firmly adhesive bonding the specific resin to a saponified ethylene-vinyl acetate copolymer and thereby provide a multi-layer resin laminate which exhibits excellent moisture impermeability and oxygen barrier properties.

The present inventors made intensive studies and discovered that specific modified polyolefin resin compounds are effective to solve the aforementioned drawbacks.

In order to achieve the above objects, according to one aspect of the present invention, there is provided a resin laminate in which a gas barrier resin layer (layer A) made of a saponified ethylene-vinyl acetate copolymer or a polyamide resin and a layer (layer B) made of at least one type of thermoplastic resin selected from a group consisting of a polycarbonate resin, a chlorine containing resin, a thermoplastic polyester resin, an acrylic resin and a styrene resin are adhesive bonded to each other using an adhesive polymer layer (layer C) made of a polymer composition consisting essentially of 0.5 to 99.5 parts by weight of graft modified polyolefin having 0.01 to 10 wt % of unsaturated carboxylic acid or unsaturated carboxylic anhydride, and 99.5 to 0.5 parts by weight of modified ethylene-vinyl acetate copolymer in which 2 wt % or more of vinyl acetate is graft copolymerized in ethylene-vinyl acetate copolymer having 5 to 50 wt % of vinyl acetate. A total amount of vinyl acetate in the modified ethylene-vinyl acetate copolymer is 20 to 80 wt % and MFR thereof is 0.5 to 30 g/10 minutes.

According to another aspect of the invention, there is provided a laminate which uses as an adhesive polymer a modified ethylene-vinyl acetate copolymer obtained by heating an aqueous suspension containing ethylene-vinyl acetate copolymer particles having 5 to 50 wt % vinyl acetate, a vinyl acetate monomer and a radical generator to a temperature at which decomposition of the radical generator does not substantially occur to impregnate the ethylene-vinyl acetate copolymer particles with the monomer and then by heating the aqueous suspension to or above a temperature at which decomposition of the generator occurs to carry out graft copolymerization of the monomer and the ethylene-vinyl acetate copolymer and thereby obtain the modified copolymer whose graft ratio of the monomer is 2 wt % or more.

DETAILED DESCRIPTION OF THE INVENTION (1) Resin exhibiting the gas barrier properties Saponified ethylene-vinyl acetate copolymer or polyamide resin can be used as the resin exhibiting the gas barrier properties that is used as the layer A of the laminate according to the present invention.

There is no limitation to the chemical composition of the saponified ethylene-vinyl acetate copolymer. However, a saponified ethylene-vinyl acetate copolymer obtained by saponifying ethylene-vinyl acetate copolymer whose proportion of ethylene is 25 to 50 mol % so that the resultant copolymer has a degree of saponification of 93% or above, more particularly, of 96% or above is desirable from the viewpoint of gas barrier properties, oil resistance and permeability to vapor.

As the polyamide resin, linear polymer having acid amide bonds and obtained by condensation of diamine and dicarboxylic acid, condensation of amino acid or ring-opening of lactam can be used. Examples of such linear polymer are nylon 6, nylon 6.6, nylon 6.10, nylon 11 and nylon 12.

(2) Specific thermoplastic resin

A polycarbonate resin (PC), a chlorine containing resin, a thermoplastic polyester resin (PES), an acrylic resin or a styrene resin can be used as the thermoplastic resin which forms the layer B of the laminate according to the present invention.

(a) Polycarbonate resin

The PC that can be used to form the layer B of the laminate according to the present invention is a polymer obtained by causing a dihydroxy compound to react with phosgene or diphenyl carbonate by the known method. Particularly, a PC made by using as the dihydroxy compound 4,4'-dihydroxy-diphenyl-2,2'-propane (bisphenol A) is desirable in terms of mechanical properties and transparency.

PCs suitably selected from those which are available on the market can be used in this invention. Various types of additives, such as stabilizers, coloring agents, fillers, nucleators and softening agents and so on, can be added to the PC in a ratio which does not deteriorate the effect of the invention.

(b) Chlorine containing resin

Examples of the chlorine containing resins that can be used to form the layer B of the laminate according to the present invention include polyvinyl chloride, polyvinylidene chloride, vinyl chloride-vinylidene chloride copolymer, vinyl chloride-vinyl acetate copolymer, vinyl chloride-propylene copolymer, vinyl chloride-acrylonitrile copolymer, and vinyl chloride-styrene copolymer. Among these resins, polyvinyl chloride and vinyl chloride-vinylidene chloride copolymer are particularly preferable.

Chlorine containing resins suitably selected from those which are available on the market can be used in the present invention. Various type of additives, such as a plasticizers, stabilizers, fillers, antistatic additives and pigments and so on, can be added to the chlorine containing resin in a ratio which does not deteriorate the effect of the invention.

(C) Thermoplastic polyester

PES that can be used to form the layer B of the laminate according to the present invention is a polymer produced by the direct polymerization of diols and dicarboxylic acids or by the ester exchange between diols and dicarboxylic acid esters. A PES containing as the diol component 1,2-ethanediol or 1,4-butanediol and as the dicarboxylic acid component terephthalic acid is desirable in terms of the heat resistance and mechanical strength. A PES suitably selected from those which are available on the market can be used in the present invention. Various types of additives, such as stabilizers, coloring agents, fillers, nucleators and softening agents and so on, can be added to the PES used in the present invention in a ratio which does not deteriorate the effect of the invention.

(d) Acrylic resin

Examples of the acrylic resin that can be used to form the layer B of the laminate according to the present invention include polymethylacrylate, polyethylacrylate, polybutylacrylate, poly(2-ethyl hexyl)acrylate, polymethylmethacrylate, polyacrylonitrile, polymethacrylonitrile, methylmethacrylate-acrylonitrile copolymer, and methylmethacrylate-α-methylstyrene copolymer. Among these examples, polymethylmethacrylate is particularly preferable.

Acrylic resins suitably selected from those which are available on the market can be used in the present invention. Various types of additives, such as plasticizers, stabilizers, fillers, antistatic additives and pigments and so on, can be added to the acrylic resin used in the invention in a ratio which does not deteriorate the effect of the invention.

(e) Styrene resin

Examples of the styrene resins that can be used to form the layer B of the laminate according to the present invention include polystyrene, impact resistant polystyrene, styrene-acrylonitrile copolymer, styrene-acrylonitrilebutadiene copolymer, styrene-methylmethacrylate copolymer, styrene-butadiene styrene block copolymer (SBS), styrene isobutylene styrene block copolymer (SIS), hydrogenated SBS (SEBS) and hydrogenated SIS (SEPS). Among these examples, polystyrene, impact resistant polystyrene, styreneacrylonitrile copolymer, styrene-acrylonitrile-butadiene copolymer are particularly preferable.

Styrene resins suitably selected from those which are available on the market can be used in the present invention. Various types of additives, such as plasticizers, stabilizers, fillers, antistatic additives and pigments and so on, can be added to the styrene resin used in the present invention in a ratio which does not deteriorate the effect of the invention.

(3) Adhesive polymer

The adhesive polymer that can be used to form the layer C of the laminate according to the present invention consists essentially of polyolefin graft modified by unsaturated carboxylic acid or unsaturated carboxylic anhydride and modified ethylene-vinyl acetate copolymer in which vinyl acetate is graft copolymerized in ethylene-vinyl acetate copolymer.

(a) Graft modified polyolefin

A graft modified polyolefin which can be used as one component of the adhesive resin is one in which at least part of a polymer or copolymer of olefins is grafted by unsaturated carboxylic acid or unsaturated carboxylic anhydride. Polymer or copolymer of olefins includes a homopolymer of olefin and copolymer or block polymer of olefin and a copolymerizable monomer.

Examples of such polymers or copolymers of olefins include homopolymers of α-olefins, such as ethylene, propylene, 1-butene, 1-pentene, 3-methyl-1-butene, 1-hexene and 4-methyl-1-pentene, copolymers of at least two types of α-olefins, and copolymers of any of the aforementioned olefins and copolymerizable vinyl acetate, acrylonitrile or acrylic ester, or mixtures thereof.

Polymers or copolymers of olefins also include single homopolymers, and single copolymers, and mixtures of these homopolymers and copolymers. In these cases, polymers may be resinous polymers or elastomers.

Unsaturated carboxylic acid monomer or unsaturated carboxylic anhydride monomer used to carry out grafting of the modified olefin polymer may be an acid, such as acrylic acid, methacrylic acid, maleic acid, fumaric acid or itaconic acid, or anhydride of any of these acids. Among those examples, maleic anhydride is most preferable.

Grafting of any of these monomers and the aforementioned olefin polymer may be carried out by the known method. For example, grafting may be carried out by heating the olefin polymer and the monomer with or without a radical generator added thereto to high temperatures in the presence or absence of a solvent.

The final ratio of the graft monomer to the olefin polymer is between 0.01 and 10 wt %, and more preferably, between 0.1 and 5 wt %, based on the total weight of the graft product. Industrially, a olefin polymer obtained by carrying out grafting of 0.5 to 15 wt % of the monomer is manufactured first, and this olefin polymer is diluted by a non-modified olefin polymer. This method is desirable because the content of the graft monomer can be adequately adjusted. However, only the modified olefin polymer may be used. In the case where the ratio of the graft monomer to the olefin polymer is too little, adhesion of the adhesive polymer layer to the resin exhibiting the gas barrier properties cannot be enhanced.

(b) Modified ethylene-vinyl acetate copolymer

The modified ethylene-vinyl acetate copolymer (hereinafter referred to as "a modified EVA"), one component of the adhesive polymer layer that can be used in the present invention, is a copolymer obtained by carrying out graft copolymerization of vinyl acetate and ethylene-vinyl acetate copolymer (hereinafter referred to as an "EVA") having 5 to 50 wt %, preferably, 10 to 35 wt % of vinyl acetate, such that the graft ratio of vinyl acetate is 2 wt % or more. The MFR of the modified EVA is between 0.5 and 30 g/10 minutes, preferably, between 1 to 10 g/10 minutes. The content of the vinyl acetate to the total weight of the modified EVA is between 20 and 80 and preferably, between 20 and 50 wt %.

When the content of vinyl acetate in EVA is less than 5 wt %, diffusion of vinyl acetate monomer used to modify EVA is made difficult. This in turn makes manufacture of homogeneous modified EVA difficult. More than 50 wt % of vinyl acetate deteriorates processability of the resultant polymer. MFR of EVA is generally between 5 and 400 g/10 minutes, more preferably, between 10 and 200 g/10 minutes.

The amount of vinyl acetate monomer is determined on the basis of the total amount of vinyl acetate contained in the finally produced modified EVA. When the total amount of vinyl acetate contained in the modified EVA is less than 20 wt %, it is difficult to balance adhesion and strength and this makes the accomplishment of a predetermined object difficult. More than 80 wt % of vinyl acetate contents deteriorates moldability.

Vinyl acetate may be contained in the modified EVA in the form of graft bonded vinyl acetate and finely dispersed homopolymer as well.

The graft ratio of vinyl acetate in the modified EVA must be 2 wt % or more. When the graft ratio of vinyl acetate is less than 2 wt %, adhesion and strength cannot be balanced and, hence, the predetermined object is difficult to achieve.

MFR of the modified EVA is between 0.5 and 30 g/10 minutes. When MFR is less than 0.5 g/10 minutes, thinning of the adhesive polymer is difficult. When MFR is more than 30 g/10 minutes, moldability deteriorates.

Vinyl acetate monomers which are available on the market can be used to carry out graft copolymerization with EVA. Mixtures of more than 50 wt % of vinyl acetate monomer and the balance of any other vinyl monomer which is copolymerizable with a vinyl acetate monomer may also be used. Examples of other vinyl monomers include: vinyl esters, such as vinyl propionate and vinyl versenate; unsaturated organic acids, such as acrylic acid, ethylacrylate, butylacrylate, 2-ethylhexyl acrylate, methacrylic acid, methylmethacrylate, butylmethacrylate, maleic anhydride, dimethylmaleate and di (2-ethylhexyl) maleate and derivatives of these unsaturated organic acids; unsaturated aromatic monomers, such as styrene and 2,5-dichlorostyrene; unsaturated aromatic monomers, such as acrylonitrile and methacrylonitrile; and unsaturated monoor dihalides, such as vinyl chloride and vinylidene chloride.

Graft reaction of EVA and vinyl acetate monomer may be carried out using radiation or a radical generator.

General-purpose radical generators can be used in the present invention. A radical generator whose decomposition temperature for achieving half-time of ten hours is 50° C. or above and which is oil-soluble is preferably used in terms of the graft reaction which will be described later.

"Decomposition temperature for achieving half-time of ten hours" refers to the temperature at which 50% of 0.1 mol of radical generator added to 1 liter of benzene decomposes when it is left for 10 hours.

When a radical generator whose decomposition temperature is low is used, polymerization of vinyl acetate monomer may progress excessively. This makes manufacture of homogeneous modified EVA impossible. When a combination of radical generators whose decomposition temperatures are high and low is used, decomposition may be carried out stepwise or in sequence to achieve effective graft reaction.

Examples of radical generators include: organic peroxides, such as 2,4-dichlorobenzoyl peroxide, t-butyl peroxypivalate,o-methylbenzoyl peroxide, bis-3,5,5-trimethylhexanoyl peroxide, octanoyl peroxide, benzoyl peroxide, t-butyl peroxy-2-ethylhexanoate, cyclohexanone peroxide, 2,5-dimethyl-2,5-dibenzoyl peroxyhexane, t-butyl peroxybenzoate, di-t-butyl-diperoxyphtalate, methylethylketone peroxide, dicumyl peroxide and di-t-butyl peroxide; and azo compounds, such as azobisisobutyronitrile and azobis (2,4-dimethylvaleronitrile).

The amount of the radical generator is between 0.01 to 10 wt % based on the weight of vinyl acetate monomer and is appropriately changed according to the type of radical generator or the reaction condition. When the amount of the radical generator is less than 0.01 wt %, reaction does not progress smooth. The use of more than 10 wt % of radical generator easily produces gel in the modified EVA.

Aqueous suspension grafting which will be described below, is used as the graft reaction of the aforementioned components because it is preferable from the viewpoint of control of gel.

That is, aqueous suspension, containing EVA particles having 5 to 50 wt % of vinyl acetate, vinyl acetate monomer and a radical generator, is heated to a temperature at which decomposition of this generator does not substantially occur so as to impregnate the EVA particles with the monomer until the amount of the free monomer is less than 20 wt %. Thereafter, the aqueous suspension is further heated to complete polymerization of the monomer. When the amount of the free vinyl acetate monomer which is not impregnated in the EVA particles is large, homopolymers of vinyl acetate may be formed during polymerization. This adversely affects the properties of the graft copolymer. Impregnation of the EVA particles with the vinyl acetate monomer will be described in detail below.

Impregnation of EVA Particles with Vinyl Acetate

Typically, impregnation of the EVA particles with the vinyl acetate monomer in the presence of an aqueous medium is initiated by adding a vinyl acetate monomer in which the radical generator (and other additives, if necessary) is preferably dissolved to the aqueous suspension of EVA particles and then by stirring the mixture. Alternatively, impregnation of the EVA particles with the vinyl acetate monomer is started by adding EVA particles to the aqueous dispersant of vinyl acetate monomer in which the radical generator is dissolved and then by stirring the mixture.

In the impregnation process which is carried out on an industrial basis, the aqueous suspension is heated to a temperature at which decomposition of the radical generator does not substantially occur to impregnate the EVA particles with the vinyl acetate monomer effectively. The aqueous suspension is generally heated to a temperature ranging from room temperatures to 100° C., more preferably, to a temperature ranging from 40° to 100° C., especially from 40° to 60° C.

Since EVA and vinyl acetate monomers are relatively soluble to each other, less than 20 wt % of free vinyl acetate monomer present in the EVA before graft polymerization reaction is initiated is impregnated in EVA particles during the subsequent polymerization. Therefore, polymerization of the free vinyl acetate monomer alone and, hence, separate precipitation of polyvinyl acetate particles does not occur. The impregnation time is generally between 2 and 8 hours.

The ratio of the EVA particles and vinyl acetate monomer to water in the aqueous suspension is generally between 5 to 100 parts by weight relative to 100 parts by weight of water.

Sufficient stirring is enough to allow such an aqueous suspension to maintain its stable suspended state. However, the use of an adequate suspension stabilizer allows a stable suspension to be readily provided. Examples of such suspension stabilizers include water soluble polymeric materials, such as polyvinyl alcohol, methylcellulose and hydroxycellulose, anionic surface active agents, such as alkylbenzenesulfonate, nonionic surface active agents, such as polyoxyethylene alkyl ether, or water-insoluble inorganic salts, such as magnesium oxide and calcium phosphate. These suspension stabilizers are used separately or in the form of a mixture of water and the stabilizer. The ratio of the stabilizer to water is between 0.01 and 10 wt %.

When EVA particles are impregnated with the vinyl acetate monomer (and the radical generator), they may also be impregnated with various ancillary materials, such as a plasticizer, a lubricant and an antioxidant (these ancillary materials may be added to EVA beforehand or may be added to the copolymer after graft polymerization reaction.

Polymerization

The thus-prepared aqueous suspension is heated to a temperature at which the used radical generator decomposes at a suitable rate or above to carry out graft copolymerization on the EVA impregnated with the vinyl acetate monomer and thereby produce modified EVA particles.

It is desirable that the aqueous suspension be stirred adequately during polymerization.

Polymerization temperature is adequately selected from between 50° and 100° C. It is not necessary to maintain the polymerization temperature to a fixed value throughout the polymerization process. At a polymerization temperature of 100° C. or above, not only are the particles likely to gelate, but they are also likely to be finely devided by stirring or otherwise coagulate into a lump.

Generally, polymerization time lasts 2 to 10 hours. After the polymerization, the same after-treatment as that performed after aqueous suspension polymerization of vinyl monomer (e.g., styrene) is performed to obtain modified polymer particles which maintain the shape of the used EVA particles. EVA may be used in the form of powder to obtain modified EVA powder. However, when handling in the subsequent processes is taken into consideration, it is more convenient to use EVA particles. That is, EVA particles having a normal particle size are desirable because the modified polymer can be used as the molding material without changing the shape. The average particle size of the EVA particles is generally between 1 and 8 mm, more preferably, between 3 and 7 mm. The modification process does not substantially change the original particle size of the EVA particles.

(c) Manufacture of adhesive polymer

The adhesive polymer layer which is the layer C of the laminate according to the present invention consists essentially of 0.5 to 99.5 parts by weight of said graft modified polyolefin and 99.5 to 0.5 parts by weight of modified EVA (100 parts by weight in total). Preferably, the adhesive polymer layer consists of 5 to 95 parts of weight of said graft modified polyolefin and 95 to 5 parts by weight of modified EVA.

When the amount of the graft modified polyolefin is less, adhesion between the adhesive polymer and the layer A which is the resin layer exhibiting the gas barrier properties deteriorates. With less amount of the modified EVA, adhesion between the adhesive polymer layer and the layer B which is the selected specific thermoplastic resin layer deteriorates.

Other EVAs, inorganic fillers, stabilizers or coloring agents can be added to the adhesive polymer so long as they do not deteriorate the effect of the present invention. For example, petroleum resins or tacky producers, normally used in the hot-melt type adhesives, may be added to the adhesive polymer.

The adhesive polymer may be manufactured by charging the individual components as an adhesive polymer layer. Alternatively, the components are mixed or kneaded first to manufacture an adhesive polymer and then the manufactured adhesive polymer is formed into a layer.

(4) Manufacture of resin laminate

The laminate according to the present invention can be manufactured by laminating resins or polymers which form the individual layers by co-extrusion, pressing or extrusion laminating.

The resin laminate according to the present invention includes a laminate consisting of the aforementioned three layers, and a multi-layer resin laminate consisting of the above-described three layers and at least one other layer. Other layers may be made of α-olefin resins, such as polyethylene and polypropylene; various types of rubbers, such as ethylene-propylene copolymer rubber, acrylonitrile-butadiene rubber and styrene-butadiene rubber; styrene resins, such as polystyrene and acrylonitrile-butadiene-styrene (ABS) resin; chlorine containing resins, such as polyvinyl chloride and polyvinylidene chloride; fluororesins, such as polyvinyl fluoride and polyvinylidene fluoride; metals, such as aluminum and iron; thermosetting resins, such as unsaturated polyester, epoxy resin and urethane resin; or engineering plastics, such as polyacetal, polysulfone and polyphenylene ether.

EXAMPLES

An embodiment of the present invention will be described below.

REFERENCE EXAMPLE (Manufacture of Modified EVA)

A mixture of 20 kg of water, 0.6 kg of tribasic calcium phosphate and 0.6 g of sodium dodecylbenzene sulfonate both serving as suspending agents were charged into an autoclave having a volume of 50 liters to prepare an aqueous medium. 7 kg of EVA particles having a particle size of 3 to 4 mm (MFR: 30 g/10 minutes, proportion of vinyl acetate: 33 wt %) were added to and suspended in the aqueous media by stirring. 64.5 g of t-butyloperoxypivalate and 3.6 g of benzoyl poroxide were dissolved in 3 kg of vinyl acetate, and the resultant solution was added to the suspension system. Nitrogen was introduced into the autoclave and the interior of the autoclave was pressurized under 0.5 kg/cm². Thereafter, the interior of the autoclave was heated to 50° C. and the suspension was stirred at that temperature for three hours to impregnate the EVA particles with the polymerization initiator and vinyl acetate. Next, the suspension was heated to 63° C., and stirred at that temperature for eight hours to carry out polymerization. The suspension was then heated to 70° C. and kept at that temperature for two hours, and then heated to 80° C. and kept at that temperature for one hour to complete polymerization. After the polymer was cooled, the solid contents were taken out and washed with water to obtain 10 kg of modified EVA particles. MFR of the obtained modified EVA was 1.0 g/10 minutes and the proportion of vinyl acetate contents thereof was 53 wt %.

Extraction of the obtained modified EVA particles was conducted using acetone to remove non-grafted vinyl acetate polymer. The graft ratio of the obtained modified EVA particles measured by infrared absorption spectrum was 15 wt %.

The graft ratio is given by:

$$\text{graft ratio} = \frac{\text{proportion of the grafted monomer}}{\text{proportion of polymerized monomer}} \times 100\ (\%)$$

EXAMPLE 1

The modified EVA particles obtained in the Reference Example and maleic anhydride graft modified polyolefin particles having 0.7 wt % of maleic anhydride were mixed with each other in a ratio shown in Table 1. Thereafter, the mixture was melted and kneaded at 140° C. and was then pelletized. Three-layer extrusion sheets were manufactured using, as the intermediate adhesive polymer layer, the obtained pellets, as the outer layer, a PC (Eupylon E-200 manufactured by Mitsubishi Gas Chemical Co.) and, as an inner layer, saponified EVA (Eval F101A, manufactured by Kuraray Co., Ltd) or polyamide (Novamid 1020CA, manufactured by Mitsubishi Kasei Co.), (The thickness of PC, adhesive polymer and saponified EVA or polyamide was respectively 200 μm, 50 μm, and 50 μm). To measure the initial adhesion strength of the obtained sheets, samples were taken out in a 10 mm width from the extrusion sheets. The interlayer adhesion strength of the samples was measured using an Instron type tensile tester (stress rate: 50 mm/minute, peeled at 180 degrees). The results of the measurements are shown in Table 1.

COMPARATIVE EXAMPLE 1

Three-layer extrusion sheets were manufactured in the same manner as that of Example 1 with the exception that EVA (X-700, manufactured by Mitsubishi Petrochemical Co., Ltd.) was also used as the adhesive polymer in addition to the components used in Example 1. The initial adhesion strength of the obtained sheets is shown in Table 1.

TABLE 1

| | Composition of Adhesive Layer | | | Peel Strength | | |
|---|---|---|---|---|---|---|
| | | Maleic Anhydride | | | | |
| | Modified EVA*1 parts by weight | Graft Modified Polyolefin*2 parts by weight | Non Modified EVA*3 parts by weight | PC Surface g/10 mm | Saponified EVA Surface g/10 mm | Polyamide Surface g/10 mm |
| Example 1 | 80 | 20 | — | 2000 | 2000 | No Peeling |
| | 50 | 50 | — | 1800 | 1800 | No Peeling |
| Comparative Example 1 | — | 100 | — | 300 | 2000 | No Peeling |
| | — | 50 | 50 | 500 | 1500 | No Peeling |
| | 100 | — | — | 2000 | 300 | 500 |

*1 Modified EVA of Reference Example (proportion of vinyl acetate: 53 wt %, MFR: 1.0 g/10 minutes)
*2 Maleic anhydride graft modified polyolefin (proportion of vinyl acetate: 28 wt %, maleic anhydride: 0.7 wt %)
*3 Non-modified EVA (proportion of vinyl acetate: 33 wt %, MFR: 30 g/10 minutes)

EXAMPLE 2

Three-layer extrusion sheets were manufactured in the same manner as that of Example 1 with the exception that polyvinyl chloride (Vinyca Compound D-126, manufactured by Mitsubishi Kasei Vinyl Co.) was used as the outer layer, and the same measurements were performed on the sheets. The results of the measurements are shown in Table 2.

COMPARATIVE EXAMPLE 2

Three-layer extrusion sheets were manufactured in the same manner as that of Comparative Example 1 with the exception that the polyvinyl chloride of Example 2 was used as the outer layer, and the same measurements were conducted on the sheets. The results of the measurements are shown in Table 2.

TABLE 2

| | Composition of Adhesive Layer | | | Peel Strength | | |
|---|---|---|---|---|---|---|
| | | Maleic Anhydride | | | | |
| | Modified EVA*1 parts by weight | Graft Modified Polyolefin*2 parts by weight | Non-Modified EVA*3 parts by weight | Polyvinyl Chloride Surface g/10 mm | Saponified EVA Surface g/10 mm | Polyamide Surface g/10 mm |
| Example 2 | 80 | 20 | — | 2000 | 2000 | No Peeling |
| | 50 | 50 | — | 2000 | 1800 | No Peeling |
| Comparative Example 2 | — | 100 | — | 500 | 1500 | No Peeling |
| | — | 50 | 50 | 700 | 1700 | No Peeling |

TABLE 2-continued

| | Composition of Adhesive Layer | | Peel Strength | | |
|---|---|---|---|---|---|
| Modified EVA*1 parts by weight | Maleic Anhydride Graft Modified Polyolefin*2 parts by weight | Non-Modified EVA*3 parts by weight | Polyvinyl Chloride Surface g/10 mm | Saponified EVA Surface g/10 mm | Polyamide Surface g/10 mm |
| 100 | — | — | 2000 | 400 | 500 |

*1 Modified EVA of Reference Example (proportion of vinyl acetate: 53 wt %, MFR: 1.0 g/10 minutes)
*2 Maleic anhydride graft modified polyolefin (proportion of vinyl acetate: 28 wt %, maleic anhydride: 0.7 wt %)
*3 Non-modified EVA (proportion of vinyl acetate: 33 wt %, MFR: 30 g/10 minutes)

EXAMPLE 3

Three-layer extrusion sheets were manufactured in the same manner as that of Example 1 with the exception that PES (Dianite PA500X, manufactured by Mitsubishi Rayon Co.) was used as the outer layer, and the same measurements were performed on the sheets. The results of the measurements are shown in Table 3.

COMPARATIVE EXAMPLE 4

Three-layer extrusion sheets were manufactured in the same manner as that of Comparative Example 1 with the exception that the polymethylmethacrylate of Example 4 was used as the outer layer, and the same measurements were conducted on the sheets. The results of the measurements are shown in Table 4.

TABLE 4

| | Composition of Adhesive Layer | | | Peel Strength | | |
|---|---|---|---|---|---|---|
| | Modified EVA*1 parts by weight | Maleic Anhydride Graft Modified Polyolefin*2 parts by weight | Non-Modified EVA*3 parts by weight | Acrylic Resin Surface g/10 mm | Saponified EVA Surface g/10 mm | Polyamide Surface g/10 mm |
| Example 4 | 80 | 20 | — | 1500 | 2000 | No Peeling |
| | 50 | 50 | — | 1400 | 2000 | No Peeling |
| Comparative | — | 100 | — | 300 | 2000 | No Peeling |
| Example 4 | — | 50 | 50 | 400 | 2000 | No Peeling |
| | 100 | — | — | 1500 | 400 | 400 |

*1 Modified EVA of Reference Example (proportion of vinyl acetate: 53 wt %, MFR: 1.0 g/10 minutes)
*2 Maleic anhydride graft modified polyolefin (proportion of vinyl acetate: 28 wt %, maleic anhydride: 0.7 wt %)
*3 Non-modified EVA (proportion of vinyl acetate: 33 wt %, MFR: 30 g/10 minutes)

COMPARATIVE EXAMPLE 3

Three-layer extrusion sheets were manufactured in the same manner as that of Comparative Example 1 with the exception that the PES of Example 3 was used as the outer layer, and the same measurements were conducted on the sheets. The results of the measurements are shown in Table 3.

EXAMPLE 5

Three-layer extrusion sheets were manufactured in the same manner as that of Example 1 with the exception that impact-resistant polystyrene (Denkastyrole HI-E4, manufactured by Denki Kagaku Kogyo K.K.) was used as the outer layer, and the same measurements were performed on the sheets. The results of the measurements are shown in Table 5.

TABLE 3

| | Composition of Adhesive Layer | | | Peel Strength | | |
|---|---|---|---|---|---|---|
| | Modified EVA*1 parts by weight | Maleic Anhydride Graft Modified Polyolefin*2 parts by weight | Non-Modified EVA*3 parts by weight | PES Surface g/10 mm | Saponified EVA Surface g/10 mm | Polyamide Surface g/10 mm |
| Example 3 | 80 | 20 | — | 2000 | 2000 | No Peeling |
| | 50 | 50 | — | 1800 | 2000 | No Peeling |
| Comparative | — | 100 | — | 500 | 2000 | No Peeling |
| Example 3 | — | 50 | 50 | 600 | 1800 | No Peeling |
| | 100 | — | — | 2000 | 300 | 4 |

*1 Modified EVA of Reference Example (proportion of vinyl acetate: 53 wt %, MFR: 1.0 g/10 minutes)
*2 Maleic anhydride graft modified polyolefin (proportion of vinyl acetate: 28 wt %, maleic anhydride: 0.7 wt %)
*3 Non-modified EVA (proportion of vinyl acetate: 33 wt %, MFR: 30 g/10 minutes)

EXAMPLE 4

Three-layer extrusion sheets were manufactured in the same manner as that of Example 1 with the exception that polymethylmethacrylate (Acrypet, manufactured by Mitsubishi Rayon Co.) was used as the outer layer, and the same measurements were performed on the sheets. The results of the measurements are shown in Table 4.

COMPARATIVE EXAMPLE 5

Three-layer extrusion sheets were manufactured in the same manner as that of Comparative Example 1 with the exception that the impact-resistant polystyrene of Example 5 was used as the outer layer, and the same measurements were conducted on the sheets. The results of the measurements are shown in Table 5.

TABLE 5

| | Composition of Adhesive Layer | | | Peel Strength | | |
| --- | --- | --- | --- | --- | --- | --- |
| | Maleic Anhydride | | | | | |
| | Modified EVA*1 parts by weight | Graft Modified Polyolefin*2 parts by weight | Non-Modified EVA*3 parts by weight | Polystyrene Surface g/10 mm | Saponified EVA Surface g/10 mm | Polyamide Surface g/10 mm |
| Example 5 | 80 | 20 | — | 1800 | 2000 | No Peeling |
| | 50 | 50 | — | 1500 | 2000 | No Peeling |
| Comparative | — | 100 | — | 500 | 2000 | No Peeling |
| Example 5 | — | 50 | 50 | 800 | 1500 | No Peeling |
| | 100 | — | — | 1800 | 400 | 400 |

*1 Modified EVA of Reference Example (proportion of vinyl acetate: 53 wt %, MFR: 1.0 g/10 minutes)
*2 Maleic anhydride graft modified polyolefin (proportion of vinyl acetate: 28 wt %, maleic anhydride: 0.7 wt %)
*3 Non-modified EVA (proportion of vinyl acetate: 33 wt %, MFR: 30 g/10 minutes)

As will be understood from the foregoing description, the laminate according to the present invention has a sufficient interlayer adhesive force, and possesses both the advantages of polycarbonate, chlorine containing resin, thermoplastic polyester, acrylic resin or styrene resin which is either an ethylene-vinyl acetate saponified copolymer or a polyamide resin. Therefore, the laminate according to the present invention can be suitably used as an industrial material such as food packaging material.

What is claimed is:

1. A resin laminate comprising:
   a gas barrier resin layer (layer A) made of a saponified ethylene-vinyl acetate copolymer or a polyamide resin;
   a layer (layer B) made of at least one type of thermoplastic resin selected from a group consisting of a polycarbonate resin, a chlorine containing resin, a thermoplastic polyester resin, an acrylic resin and a styrene resin; and
   an adhesive polymer layer (layer C) for adhesive bonding said gas barrier resin layer (layer A) and said layer (layer B), said adhesive polymer layer being made of a polymer composition consisting essentially of 0.5 to 99.5 parts by weight of graft modified polyolefin having 0.01 to 10 wt % of unsaturated carboxylic acid or unsaturated carboxylic anhydride, and 99.5 to 0.5 parts by weight of modified ethylene-vinyl acetate copolymer in which 2 wt % or more of vinyl acetate is graft copolymerized onto the ethylene-vinyl acetate copolymer having 5 to 50 wt % of vinyl acetate, the total amount of vinyl acetate in the modified ethylene-vinyl acetate copolymer being 20 to 80 wt % and MFR thereof being 0.5 to 30 g/10 minutes.

2. The resin laminate according to claim 1 wherein the modified ethylene-vinyl acetate copolymer is obtained by heating an aqueous suspension containing ethylene-vinyl acetate copolymer particles having 5 to 50 wt % of vinyl acetate, a vinyl acetate monomer and a radical generator to a temperature at which decomposition of the radical generator does not substantially occur to impregnate the ethylene-vinyl acetate copolymer particles with the vinyl acetate monomer and then by heating the aqueous suspension to or above a temperature at which decomposition of the radical generator occurs to carry out graft copolymerization of the vinyl acetate monomer and the ethylene-vinyl acetate copolymer particles and thereby obtain the modified copolymer whose graft ratio of the vinyl acetate monomer is 2 wt % or more.

3. The resin laminate according to claim 1 wherein the unsaturated carboxylic anhydride comprises maleic anhydride.

4. The resin laminate according to claim 2 wherein said radical generator is a radical generator having a decomposition temperature for achieving half-time of ten hours is 50° C. or above.

5. The resin laminate according to claim 2 wherein the temperature at which the radical generator does not substantially decompose is between 40° and 60° C.

6. The resin laminate according to claim 2 wherein the polymerization temperature is between 50° and 100° C.

7. The resin laminate according to claim 2 wherein the ethylene-vinyl acetate copolymer particles have a particle size between 1 and 8 mm.

* * * * *